Sept. 2, 1969 E. C. SIEGFREID 3,465,075
METHOD FOR MAKING A MONOLITHIC CLAY FITTING
Filed Nov. 21, 1966 3 Sheets-Sheet 1
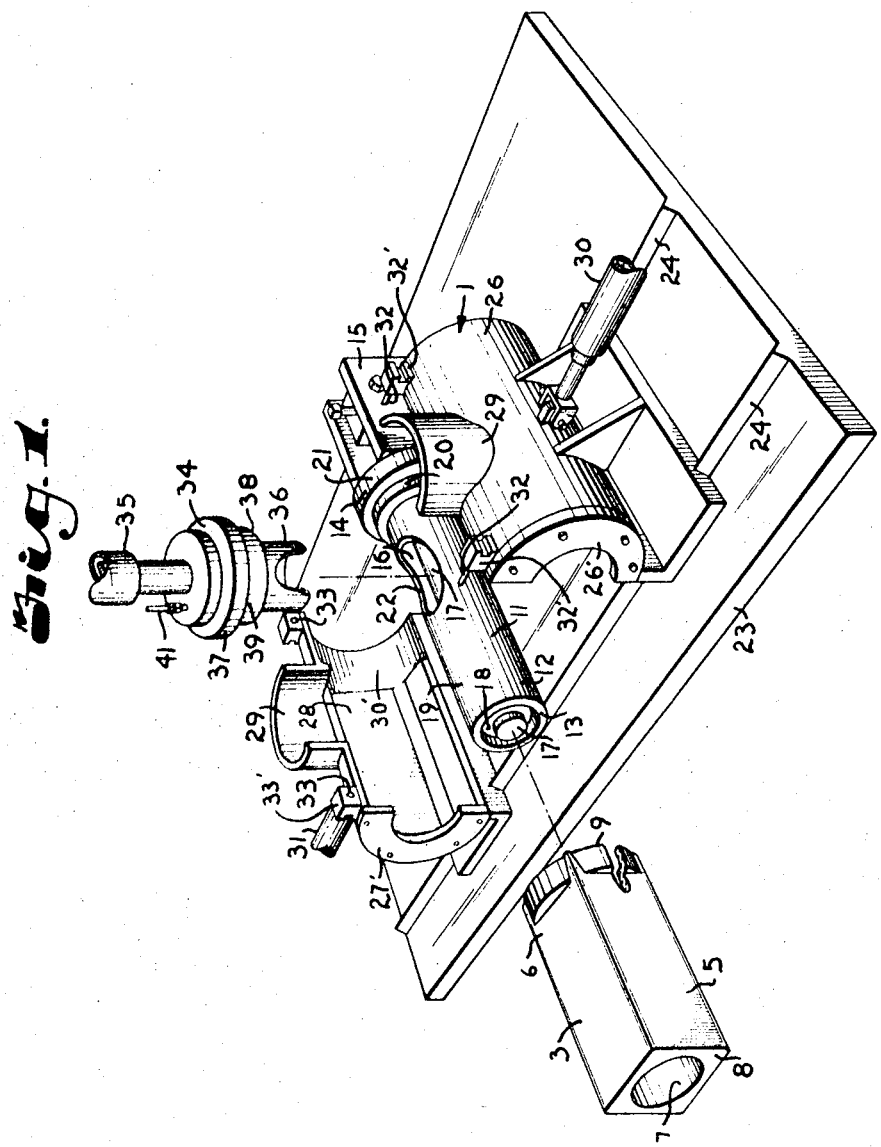
INVENTOR.
EDWARD C. SIEGFREID
BY Fishburn and Gold
ATTORNEYS

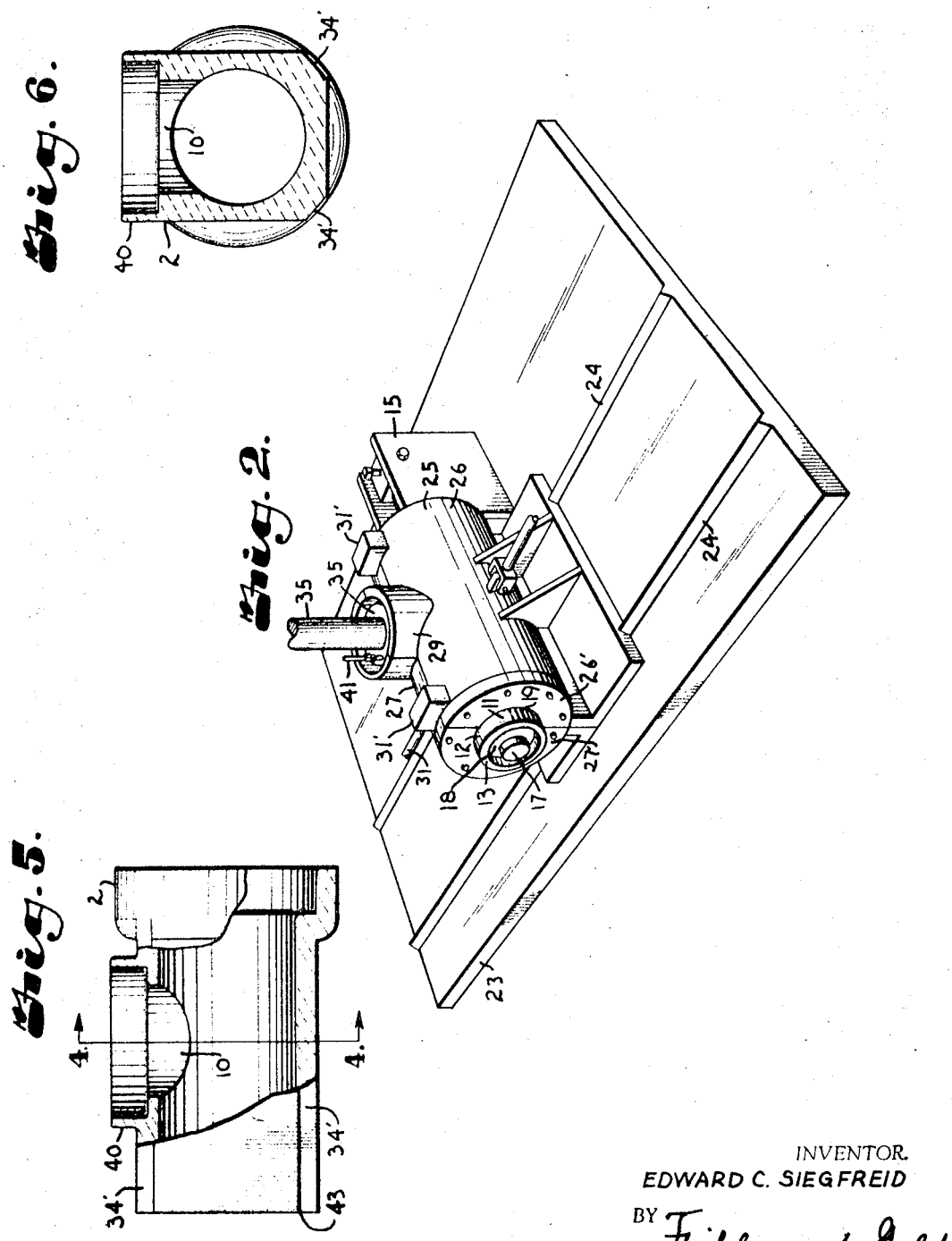

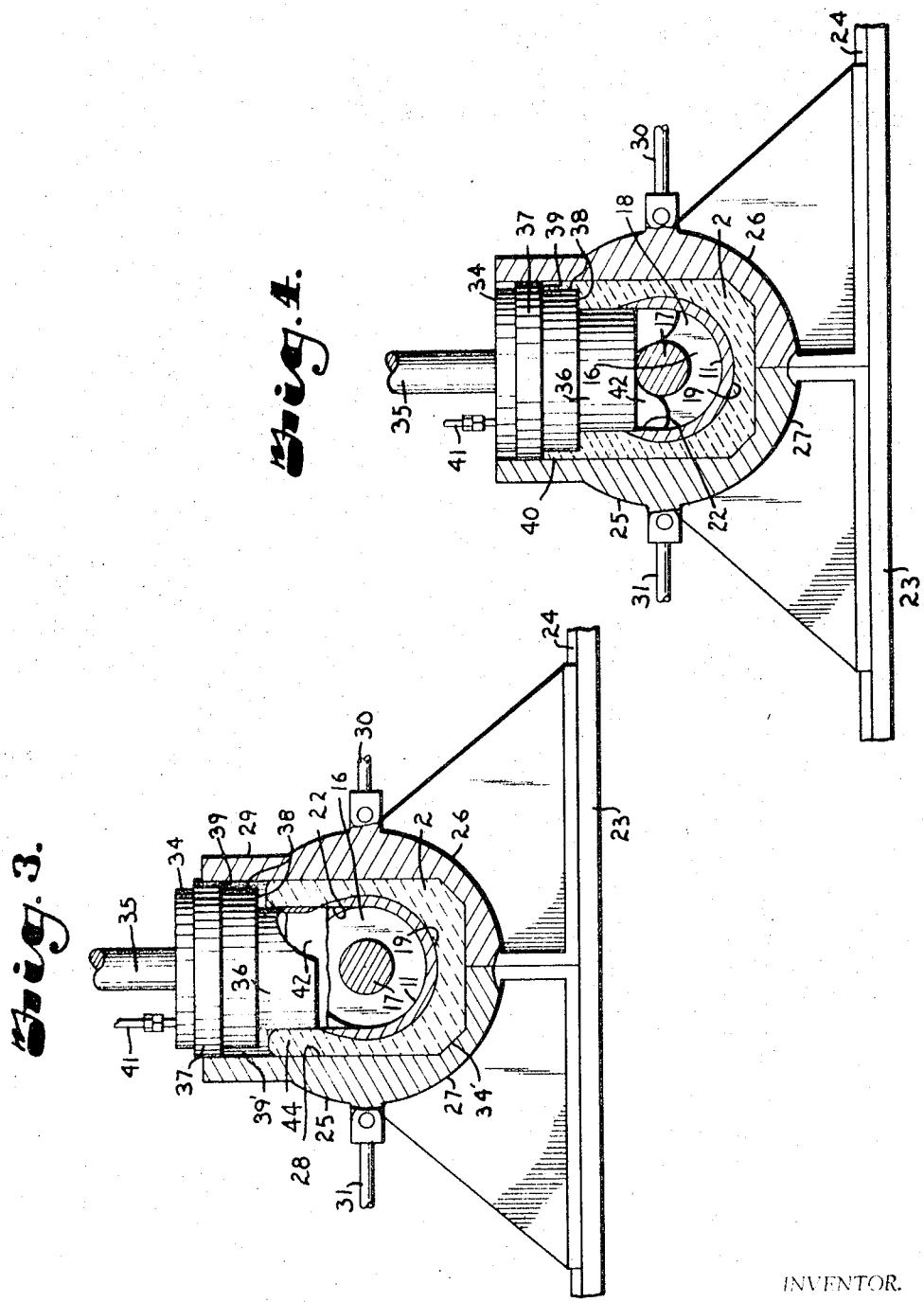

United States Patent Office 3,465,075
Patented Sept. 2, 1969

3,465,075
METHOD FOR MAKING A MONOLITHIC CLAY FITTING
Edward C. Siegfreid, Meridian, Miss., assignor to W. S. Dickey Clay Manufacturing Company, Kansas City, Mo., a corporation of Delaware
Filed Nov. 21, 1966, Ser. No. 595,950
Int. Cl. B28b 7/18, 1/48, 21/18
U.S. Cl. 264—155                                    3 Claims

ABSTRACT OF THE DISCLOSURE

A compression extruded green clay pipe section is hollow core-supported and compressed within a split shell having an inside surface configuration generally corresponding to the outside configuration of the fitting. The apparatus used to carry out the method includes a mold collar extending transversely from and communicating into the shell and receiving a moving socket former. Substantial pressure is applied to close the shell and move the socket former into the mold collar causing a portion of the recompressed green clay in the pipe section to reflow into a new configuration as defined by the shell, mold collar and socket former, producing a monolithic fitting such as a T. The former includes a projecting cutting die received into a side opening in the core for cutting out the T passageway which is surrounded by bell structure in the finished fitting.

---

This invention resides in a method for making novel clay fittings and has for its principal objects: to provide green clay extruded fittings which are monolithic in structure, including side connector portions, in contrast to conventional fittings wherein separate side connection portions are assembled with plugged pipe sections using wet clay as an adhesive and sealant; to use relatively simple and inexpensive apparatus operable to form such monolithic fittings; to provide a method of producing monolithic clay fittings which includes the step of recompressing clay in the body of an extruded green clay pipe section to force the clay to reflow into a modified shape; and to provide such a method which is easily used in high volume production and result in accurate, high quality fittings at low cost.

Other objects and advantages of this invention will become apparent from the following description taken in connection with the accompanying drawings wherein are set forth by way of illustration and example certain embodiments of this invention.

FIG. 1 is a fragmentary perspective view showing apparatus for forming a monolithic clay T fitting with the various parts thereof spread apart for receiving an extruded pipe section.

FIG. 2 is a fragmentary perspective view similar to FIG. 1 but showing the apparatus closed.

FIG. 3 is a transverse cross-sectional view through the apparatus of FIG. 2 particularly showing the T socket or bell former partially through its downward stroke.

FIG. 4 is a view similar to FIG. 3, but showing the T bell former at the limit of its downward displacement.

FIG. 5 is a partial longitudinal cross-sectional view of the finished T fitting.

FIG. 6 is a transverse cross-sectional view through the finished T fitting taken on the line 4—4, FIG. 5.

Referring to the drawings in more detail:

The reference numeral 1 generally indicates apparatus embodying this invention adapted to form a monolithic green clay fitting, in this example a T fitting 2. In the practice of this invention a clay pipe section 3 of predetermined length is formed by extruding green clay under compression from a conventional pug mill and suitable die (not shown) and has a side wall 4, in this example of varying thickness (FIG. 1), forming an elongated hollow body 5 with an outside generally rectangular surface 6, a cylindrical passageway forming inside surface 7, an unfinished spigot end 8, and a bell end 9. The pipe section 3 has a total volume of clay greater than a conventional pipe section and also greater than the volume of the fitting to be produced therefrom to provide for the removal of a quantity of clay to form a T passageway 10 (FIGS. 5 and 6).

The apparatus 1 includes a core member 11 comprised of a rigid elongated tube 12, having a free end 13 and an opposite end 14 located adjacent suitable supporting structure 15. The tube 12 is hollow on the interior 16 thereof and is supported, in this example, by means of a rod 17 mounted on the structure 15. The rod 17 extends coaxially through the core member and slidably engages radial spacers 18 located at opposite ends of the tube. The tube 12 has an outer surface 19 substantially corresponding to the inside surface 7 of the hollow body 5 for supporting the section against collapse inwardly under externally applied pressure. The end 14 of the core member 11 has radially enlarged collar member 20 thereon adapted to fit closely within the bell end 9 of the pipe section 3 to support the bell end against internal collapse in the same manner as the remainder of the hollow body 5. A larger collar member 21 adjacent the collar member 20 forms an end abutment for the bell end of the pipe section. The tube 12 has a bent circular continuous edge portion 22 intermediate the ends 13 and 14 forming a transverse generally circular opening through the cylindrical wall of the tube 12 as best illustrated in FIG. 1. The supporting structure 15 and rod 17 maintain the tube 12 extending in a horizontal direction and spaced above a rigid platform 23 having spaced apart rails or tracks 24 extending transversely of the core member.

A rigid shell 25 is split on a vertical plane extending parallel to the core member 11 forming shell half-sections 26 and 27. The shell sections 26 and 27 each have an inside surface configuration 28 which, when the shell sections are placed in face-to-face engagement as illustrated in FIG. 2, corresponds substantially to the outside surface of the T fitting 2. However, the shell sections 26 and 27 each include one-half of the transversely projecting riser or mold collar 29 which, when the shell sections are engaging each other, is axially aligned with the transverse opening formed by the edge portion 22.

The shell sections 26 and 27 are movable horizontally on the tracks 24 toward and away from the core member 11 by means of suitable opposed hydraulic rams 30 and 31. Aligning pins 32 positioned at the top of the shell sections 26 and supported by rigid brackets 32' extend toward the shell section 27 and are receivable into suitable aligned sockets 33 formed in brackets 33' thereon to insure a proper face-to-face relationship of the shell sections when urged together around the core member 11. End plates 26' and 27' form a suitable seal between one end of the core member 11 and the shell 25 when the latter is closed. A seal at the other or bell end of the core member 11 is produced by engagement of the shell inner surface at 30' with the collar member 21.

A socket former 34 is suspended by an hydraulic ram 35 and has a longitudinally projecting circular hollow die 36 axially aligned with and receivable into the transverse opening formed by the edge portion 22. Clearance between the die 36 and edge portion 22 is minimla, producing a sliding seal with the core member 11 when the ram 35 displaces the die downwardly thereinto. The socket former 34 includes a radially projecting rim 37 spaced upwardly and rearwardly of the die 36 and sized to form a sliding seal with the interior surface of the mold collar 29 when the socket former is displaced downwardly. The former 34 also has socket molding ledges 38 and 39 between the die 36 and rim 37 adapted to cooperate with the mold collar 29 to define a cavity 39′ (FIG. 3) corresponding in configuration to the transverse socket or bell 40 of the T fitting 2. A line 41 is adapted to selectively direct air under pressure into the circular hollow die 36 for a purpose discussed hereinafter.

In forming the monolithic clay T fitting 2 the extruded pipe section 3 is slid over the core member 11 until the core member end 14 supports the section bell end 9. The remainder of the section wall 4 will then be supported on the exterior surface of the tube 12 with the exception of the part overlaying the opening defined by the edge portion 22. The shell sections 26 and 27 are then urged into closed relationship under considerable pressure, for example 30 tons in recompressing an 8 inch diameter pipe section, increasing the density of the clay. If desired, the sections 26 and 27 may be then physically locked together by suitable clamp means 31′ engaging the adjacent brackets 32′ and 33′. The closed shell recompress the clay in the pipe section 3 causing the generally square corners of the section to be urged radially inwardly forming flattened strips 34′ thereat, flowing green clay toward the mold collar 29 and increasing clay density around the mold collar 29. The socket former 34 is then directed downwardly into the mold collar 29 and continues downwardly past the point where the die 36 cuts a plug 42 from the side wall 4 of the pipe section 3 corresponding to the opening formed by the edge portion 22. When the plug 42 has been severed from the pipe section 3, a seal is produced between the edge portion 22 and the die 36 substantially preventing clay from entering therebetween. As the socket former 34 is urged downwardly, under considerable pressure, further into the mold collar 29, free space therein is reduced forcing the extruding clay 44 (FIG. 3) to move upwardly into the cavity 39′, fully filling the cavity so as to internally and externally form the transverse bell 40, FIG. 4. By introducing air under pressure through the line 41, (FIG. 4) the plug 42 may be blown out of the hollow die 36 and into the hollow interior 16 from which it may be suitably removed. The former 34 is then backed out of the formed transverse bell 40 and the shell sections 26 and 27 released and backed away from the core member 11 along the tracks 24, leaving the finished T fitting 2 free to slightly expand whereupon it may be easily stripped off the core member 11. The fitting 2 may then be placed on another apparatus (not shown) of suitable configuration where a circular cutting knife cuts conventional annular spigot dimensions (not shown) at the spigot end 43 of the fitting. As in the normal practice following pipe extrusion, the fitting may then be moved to a drying oven preparatory to firing.

In forming the clay T fitting described above it has been found that, under the described recompression, the clay flows in bulk, in the manner of a pug mill extrusion. Thus the fitting has a substantially continuous or monolithic construction and does not present the weak sections common to hand assembled fittings at the T junction. Also, it is to be understood that the above described apparatus may be easily altered by one skilled in the art and without departing from the scope of this invention to produce Y, double Y, or X fittings or the like by increasing the number and/or angle of projecting mold collars and cooperating socket formers.

What I claim and desire to secure by Letters Patent is:

1. The method of forming a monolithic clay fitting comprising the steps of:
   (a) compression extruding a clay pipe section having a side wall, said pipe section having a total clay volume greater than the volume of the fitting,
   (b) supporting said pipe section internally with a core member including a rigid tube wall having a continuous intermediate edge portion forming a transverse opening into said core member,
   (c) surrounding said pipe section with a rigid shell having an inside surface configuration substantially corresponding to the outside surface of the fitting and a side projecting mold collar aligned with said transverse opening, said core and shell cooperating in defining an enclosed space, including ends thereof for receiving said pipe section,
   (d) applying pressure urging said split shell together recompressing said pipe section,
   (e) inserting a socket former into said mold collar and urging same against said side wall during said recompression, said former having a projecting die corresponding to said edge portion and cutting a plug from said side wall, said former having a radially projecting rim spaced rearwardly of said die and forming a sliding seal with said mold collar, said former having molding ledges between said die and said rim and cooperating with said mold collar forming a bell molding cavity filled with clay from said side wall as said former is pressed therein with all of the clay of the pipe fitting under pressure, and
   (f) removing said shell and withdrawing said socket former and core member from the formed fitting.

2. The method of forming a monolithic clay fitting comprising:
   (a) compression forming a clay pipe section having a side wall,
   (b) supporting said pipe section on a core member conforming to the inside surface thereof,
   (c) closing a rigid fitting mold having a side connector molding cavity around said pipe section, the outside surfaces of the core and the inside surfaces of the mold conforming to the inside and outside and end pipe section surfaces with only that portion at the side connector molding cavity being unsupported,
   (d) inserting a movable side socket former into the side connector molding cavity to close same and then moving said former to cut a hole in the pipe section side wall and retain the clay surrounding said hole,
   (e) further moving the former in said side connector molding cavity to press the clay in the side wall and cause same to flow and fill the side connector cavity defined by the mold and former, with all of the clay of the pipe fitting under pressure, and
   (f) removing the former, confining mold and core member from the formed fitting.

3. The method of forming a monolithic clay pipe fitting comprising:
   (a) compression forming an elongate clay pipe section having a side wall,
   (b) supporting said pipe section and enclosing same within a rigid structure having a side projecting mold collar with surface of said rigid structure conforming to the inside, outside and end surfaces of the pipe section, the pipe section portion at said mold collar being the only unsupported portion thereof,
   (c) inserting a socket former into said mold collar and urging same and a projecting die thereon toward said side wall with said die cutting a plug from said side wall, and retaining the clay therearound, the mold collar being closed by a radially projecting rim spaced rearwardly of said die and forming a sliding seal with said mold collar, a bell molding cavity being formed by molding ledges on the former between said die and said rim in cooperation with said mold collar and further moving of the former into said wall moving clay therein to fill the bell molding cavity with all of the clay of the pipe fitting under pressure, and
   (d) removing the former and rigid structure from the formed fitting.

(References on following page)

References Cited

UNITED STATES PATENTS

| | | |
|---|---|---|
| 1,526,036 | 2/1925 | Zwicker. |
| 1,714,614 | 5/1929 | Mumma. |
| 2,361,933 | 11/1944 | Ferla. |
| 2,401,728 | 6/1946 | Gillette _____ 264—320 X |
| 2,277,789 | 3/1942 | Sink _____ 25—35 X |
| 2,708,783 | 5/1955 | Ripley _____ 264—323 X |
| 2,972,781 | 2/1961 | Levy _____ 264—320 |
| 2,995,796 | 8/1961 | Wahl _____ 25—105 X |
| 3,206,531 | 9/1965 | Jessen _____ 264—296 X |
| 3,271,490 | 9/1966 | Cattaneo _____ 264—296 X |
| 3,340,337 | 9/1967 | Schulze _____ 264—163 X |

ROBERT F. WHITE, Primary Examiner

S. I. LANDSMAN, Asisstant Examiner

U.S. Cl. X.R.

25—30, 39, 105; 264—294, 296, 320